United States Patent [19]

Bird

[11] 4,319,604
[45] Mar. 16, 1982

[54] SAFETY SHUT-OFF VALVE
[75] Inventor: Robert E. Bird, Eureka, Mo.
[73] Assignee: Modern Engineering Company, Inc., St. Louis, Mo.
[21] Appl. No.: 122,136
[22] Filed: Feb. 19, 1980
[51] Int. Cl.³ .............................................. F16K 31/12
[52] U.S. Cl. .................................... 137/498; 137/504; 137/460
[58] Field of Search ............... 137/498, 462, 461, 460, 137/458, 505.25, 504

[56] References Cited
U.S. PATENT DOCUMENTS

| | | | |
|---|---|---|---|
| 347,840 | 8/1886 | Stubbe | 137/458 |
| 1,410,218 | 3/1922 | Palmer | 137/498 X |
| 2,229,893 | 1/1941 | Hubka | 137/462 |
| 2,668,555 | 2/1954 | Bentolat | 137/498 |
| 3,085,589 | 4/1963 | Sands | 137/498 |
| 3,094,141 | 6/1963 | Maienknecht | 137/505.25 |
| 3,106,937 | 10/1963 | Sands | 137/462 X |
| 3,122,162 | 2/1964 | Sands | 137/498 |
| 3,367,360 | 8/1968 | Hickerson | 137/505.25 X |
| 4,010,770 | 3/1977 | Peters | 137/462 X |

Primary Examiner—Harold W. Weakley
Attorney, Agent, or Firm—Paul M. Denk

[57] ABSTRACT

In a safety shut-off valve, a housing includes a valve member therein, having a first valve seat, and against which a valve normally rests during closure, with a spring normally biasing said valve off of said first valve seat, and with the force of the pressurized fluid passing through the valve causing said valve to act against the force of a regulator and a second spring to become unseated for allowing gas flow, and reseated once again against a second valve seat when excessive pressure is encountered and which curtails the further flow of fluid through the valve housing, and thereby shutting off the fluid from its source.

16 Claims, 18 Drawing Figures

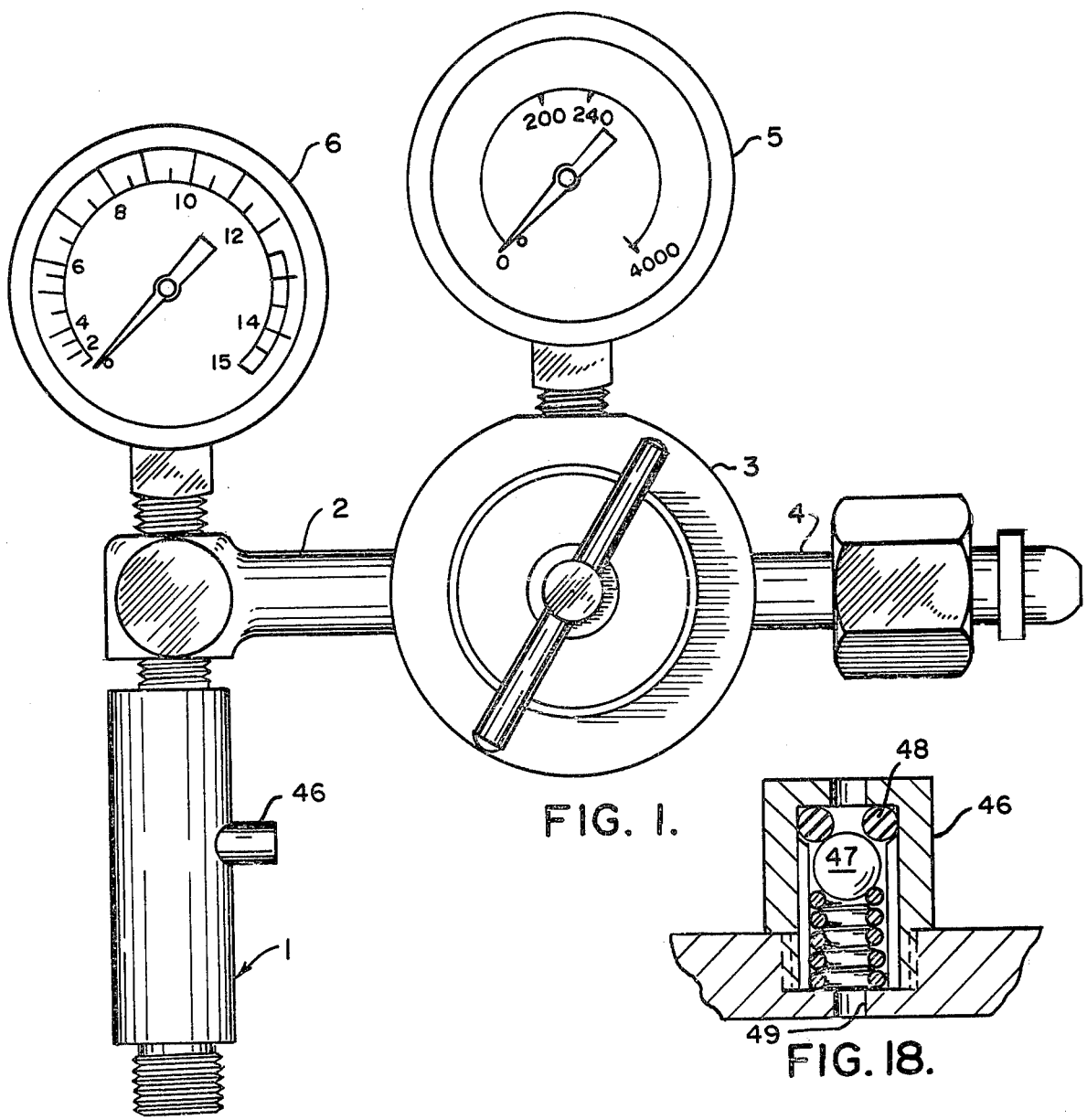
FIG. 1.
FIG. 18.
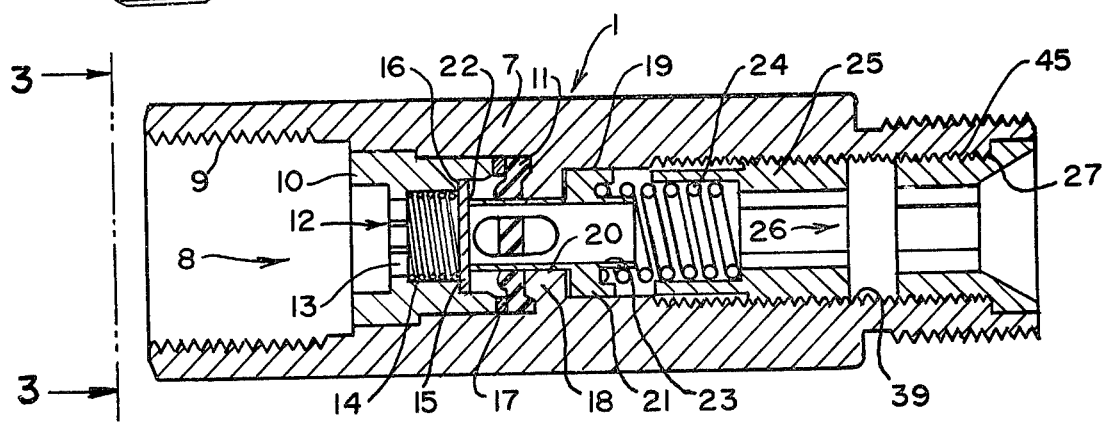
FIG. 2.

SAFETY SHUT-OFF VALVE

BACKGROUND OF THE INVENTION

This invention relates generally to a valve, and more particularly pertains to an equilibrium valve wherein it may be set to pass pressurized fluid including gas within a particular range but curtailing the flow of such fluid when that pressure range is exceeded.

A variety of shut-off, surge or lock-up single or double acting valves for use in regulating the flow in fluid, such as a gas, are provided in the prior art. And, as can be seen from such prior art, and in particularly referring to the prior U.S. patent to Sprague, U.S. Pat. No. 2,403,689, it can be seen that the concept of providing a double acting type of device for curtailing the flow of fluid through a valve is disclosed, and which incorporates a pair of springs at opposite sides of a valve head so as to regulate its functioning for preventing the flow of fluid, particularly if a failure occurs in the downstream side of its connected flowline. As can be seen in the operation of this Sprague device, as fluid pressure enters into the inlet side of the shown device, sufficient pressure builds up so as to move its internal piston structure against the bias of one of the springs, thereby allowing a pair of valve members to separate from their sealed engagement, but that should a fracture occur in the outlet line, as previously alluded to, and cause some leakage, then the back pressure that develops results in the shiftable valve member being no longer maintained in its opened capacity, but rather, that it seats positively against the tapered valve end, thereby sealing off the further flow of fluid through the valve device. Thus, this particular lock-out device, while being generally structured and fabricated to provide a double acting form of valve closure in its features is actually designed, structured, and operated to function directly oppositely from that which has been devised for the current invention, and that is to provide a valve that is designed to provide for reclosure in the event that too much or too excessive of a pressure of fluid is exerted from the incoming line, rather than have the valve function only in the event that a failure occurs at the outlet side of the apparatus at which the valve is installed.

The cut-off valve shown in the U.S. Pat. No. 2,351,035, to Grant, Jr., discloses a similar type of valve mechanism to that as previously explained, wherein its disc valve is apparently normally maintained open, but which will automatically close by the increase in the rate of flow of the fluid medium therethrough beyond a predetermined amount as previously gauged. But, once again, this valve is primarily for use in determining when breakage occurs at the downstream side of the valve, rather than to act as a means for regulating the operations of the valve against the excessive flow of pressurized gas from a pressure vessel as when it may be exceeded beyond that previously set by the on-off regulator.

The U.S. Pat. No. 2,027,762, to Becker, discloses a valve, also incorporating a pair of biasing springs therein, but wherein both of these springs operate on the same side of the valve or closure member and its accompanying piston.

The U.S. Pat. No. 3,379,213, to Billington, discloses an excess flow check valve, and which apparently is designed for the similar purposes as the current invention, and that is to prevent a too excessive flow of pressurized fluid, as in this case, a liquified petroleum gas, through and out of a flow line. And, while this prior art invention shows the cooperation between a variety of springs for regulation of the fine adjustment of its valve member, in structure this Billington device is totally dissimilar from the fabrication of the current invention as will be subsequently analyzed herein.

The prior U.S. Pat. No. 2,245,271, to Guill, discloses a safety cut-off valve, but once again for use in curtailing the flow of pressurized fluid in the event of a breakdown in the downstream side of the located valve. And, the structure of this Guill device is quite dissimilar from the component parts of the current invention. The construction of the current invention, as distinguished from this Guill patented device, is such that so long as its gas pressure through the valve is maintained at the adjusted and constant level, usually within some predetermined or preadjusted pressure range, that such pressurized fluid will continue to flow through the valve regardless that there may have been the development of a leak in the downstream side of the flow line, or if more gas is being consumed than had been anticipated. This would be so due to the equilibrium between that spring of the current invention's shut-off valve which normally maintains its flapper valve or valve means in closure, and that regulated pressure that is designed to just unseat the valve off of its first valve seat without urging the said flapper valve all the way towards the other gasket or second valve seat, which if such second seating occurs, then the shut-off valve will close and curtail the further flow of pressurized fluid through its housing.

The prior U.S. Pat. No. 2,729,234, to Stevenson, discloses what would appear to be a single acting surge valve wherein the fluctuation in pressure and flow or counterflow is taken out of the fluid line through its operations. On the other hand, there are some mechanisms within this Stevenson surge valve that have some relationship to the current invention, and that is the use of a piston that moves slidably within the valve body for either opening or providing closure in its operations but these mainly are determined through the orientation of these various discrete biasing structures and their settings within the valve body.

Finally, the prior U.S. Pat. No. 3,910,306, to Ohrn, the U.S. Pat. No. 4,049,016, to Henry, the U.S. Pat. No. 3,138,174, to Gilpin, and the prior U.S. Pat. No. 3,439,704, to Berglund, disclose other forms of more intricate types of cut-off or shut-off valves for use in regulating gas flow. More specifically, the piston like double acting valve assembly of the said Berglund disclosure also incorporates the double spring principle, and a variety of sliding pistons therein, but they are for use in conjunction with brake lines for providing a safety mechanism in the event that a disabling leak occurs in the brake assembly.

In view of the foregoing, it is the principal object of this invention to provide a shut-off valve that can be adjusted to open, function and to maintain a position of equilibrium wherein pressurized fluid may pass through the valve within a particularly set pressure range, but that when that pressure is exceeded, the valve will shut-off and curtail further flow of fluid therethrough.

A further object of this invention is to provide a double acting form of valve wherein a flapper valve is adjusted between a pair of spring means which are sensitive to both the physical setting of the valve, and the degree of pressure being exerted upon the valve by fluid passing therethrough.

Another object of this invention is to provide a safety valve that can be conveniently inserted into the outlet flow line from a regulator or its associated container of bottled gas.

Another object of this invention is to provide a shut-off valve wherein its particularly configured structure includes a series of interrelated passageways that unobstructably allow the flow of gas through the valve during normal operations, but that when the adjusted parameters for operation of the valve are exceeded, the valve will immediately shut-off.

Yet another object of this invention is to provide an adjustable shut-off valve that can be conveniently set simply through the use of a tool to operate within particular pressure ranges for a fluid or gas to be conveyed through the same.

Another object of this invention is to provide a safety shut-off valve that can be conveniently installed with little effort and expeditiously.

These and other objects will become more apparent to those skilled in the art upon reviewing the summary of this invention, and upon undertaking a study of the description of its preferred embodiment in view of the drawings.

SUMMARY OF THE INVENTION

The packaging and application of high pressure gas, as contained within a vessel or bottle, is a well known art, with applications being significantly widespread not only, for example, for hospital and medical uses, but such is also extensively employed in the metal working arts, particularly where welding and related skills are employed. Normally, the gas pressure within such a vessel may be within the range of 2,000 to 2,500, or more, psi, whereas the gas pressure at its point of usage may only be within a range and vicinity of 2 to 4 psi, and normally usually less than 100 psi, and in the case of acetylene gas ($C_2H_2$) a maximum of 15 psi. Hence, some precision is required in the regulation of the pressure at which the gas is delivered to its point of usage, and normally some type of a regulator, having an on-off valve, is attached to the outlet of the vessel to provide control over the discharge of the pressurized fluid, usually a gas, that is contained within the vessel.

While it does not happen too often, there is always that likelihood that the off-on regulator partially or fully may fail, meaning that there is no way to immediately curtail the onrush of the pressurized gas as it exits from the vessel, at least before the operator can finally turn off the handle that may be associated with the vessel to eventually achieve a shut-off of the escaping gas. But, such a time lapse may be disasterous, particularly where a welder may be employing his torch for cutting purposes with the flame being extended to a hazardous degree depending upon the amount of pressurized gas escaping from the vessel. In addition, where the bottle gas may be utilized in a hospital, the escape of gas to any degree greater than the 2 to 4 psi previously explained may be damaging if not fatal to the patient. And, the likelihood that such a hazard may occur is always incipient depending upon the condition of the diaphragm and other components within the vessel regulator.

Where the delivery of oxygen to a patient is most critical, and where the skilled technician must be assured that once he has set the pressure regulator upon the bottled gas that a flow of gas will be maintained at the constant adjusted level, then the contributions of the current invention to the art become significant, because the shut-off valve of this invention is designed to freely allow the flow of pressurized fluid or gas through its valve within a particularly adjusted pressure range, but that when that range is briefly exceeded, the valve immediately shuts off and curtails any further flow of gas therethrough. Thus, the enhancement of safety alone is a desirable addition to the art and which can be attained through the cooperative functioning of the various components forming the structure of this shut-off valve.

This current invention contemplates the formation of a shut-off valve as one constructed and having a housing which contains threaded fastening means at either end, so that the valve can be conveniently located within the flow line leading from the pressure vessel, such as by connecting directly within the gas flow regulator normally associated with the outlets from the vessel. There is a passage provided entirely through the housing, and pressure inserted within one end of the housing is a valve means, containing a valve seat, and upon which a flapper valve normally rests under conditions of gas nonuse. But located a short distance downstream from the first valve seat, formed upon an integral shoulder located internally of the valve housing, and extending slightly into its passage, is a second valve seat, with the flapper valve being disposed for fluctuating between the two aforesaid valve seats dependant upon the conditions under which the shut-off valve is being used, and the amount of pressurized fluid or gas passing through the same.

It should be understood with respect to this invention that when comment is made regarding this valve being used in conjunction with a pressurized fluid, that this term is meant to be all encompassing, and to include any type of fluid under pressure whether it be a liquid, gas, or the like.

Means are provided for equilizing the location of the flapper valve within the housing, and more specifically within its passage, in addition to its displacement between or upon one or the other of its associated valve seats. A spring means associated with the valve means, is confined in the same, at one end, and normally urges a spring bias against one side of the flapper valve, in a manner that has a tendency to continuously urge said valve from its seating upon the aforesaid first valve seat. And, a regulator, having a spring biasing against it, forcing it always in a direction against the flow of the fluid, is in contact against the opposite side of the said flapper valve, and is always urging it in a direction against the flow of fluid and towards its seating upon the first said valve seat. Thus, usuage of this particular shut-off valve is based upon the maintenance of some form of equilibrium between the biasing of these countersprings, so that when the valve is set, in a manner to be subsequently described, the pressure of the fluid attempting to flow through the passage of the housing will have a tendency, when a particular range of fluid pressure is encountered, to lift the flapper valve off of its first said valve seat, so that the fluid can then flow around said valve through both the valve means and the aforesaid regulator, for unencumbered flowage through the housing to its location of consumption and usage. The second spring means, the one that normally biases the regulator against the other side of the flapper valve, is adjustable in its setting with respect to the degree of force or bias that it urges upon the regulator, and thus upon said flapper valve. An Allen nut, or other type of retainer, threadedly engages within the opposite end of the housing, and can be adjusted through the usage of a tool, such as an Allen wrench, and to that degree to maintain the amount of compression or force upon the regulator as desired, and can be readjusted, depending upon the degree of insertion of said nut in its threaded engagement within the housing. Obviously, a further adjustment of the retainer nut into the housing further compresses its associated spring, meaning that a greater force will be exerted upon the regulator and thus upon the opposite side of the flapper valve. On the other hand, when this retainer nut is withdrawn, the force upon the second spring is lessened, meaning that it will exert a lesser degree of force upon the regulator, necessitating only a smaller amount of pressure from the flowing fluid being required for lifting the flapper valve off of its first valve seat.

In practice, and in the prototype of this invention, the regulator has been adjusted so that as little as a fraction of a psi is required to lift the flapper valve off of its first valve seat, and not much more than that, or as little as 1 psi has been needed to reseat the flapper valve for shut-off against the second valve seat. Furthermore, the experimental valve has been adjusted so that pressures in the vicinity of 125 psi or more are required for flapper valve lift off, with only a little more pressure from the fluid needed for reseating the valve upon the second valve seat. And it is during this flapper valve unseating when the pressurized gas flows unencumberedly through this shut-off valve.

But, as previously explained, depending upon the degree of force that the regulator exerts upon the flapper valve, in the event that the pressurized fluid that may have unseated the flapper valve from its first valve seat in order to maintain a free flow of fluid through the housing, when said fluid pressure becomes excessive, it eventually urges the flapper valve against the second valve seat that is longitudinally located a short distance downstream from the first valve seat, so that when the flapper valve becomes urged against that second valve seat, passage through the housing and the shut-off valve becomes curtailed, preventing any further flow of pressurized fluid through the valve, and from the gas vessel. Thus, it can be seen that the valve of this invention is of an adjustable type, and can be fixed for operation within particular pressure ranges, depending upon the setting of its retaining nut, thereby allowing this shut-off valve to react particularly under emergency conditions when an excessive amount of pressurized gas is being discharged and released from the pressure vessel, and is somehow bypassing through the upstream regulating means which may have previously been set to perform a related function. In addition, a bleed-off or release valve may be provided for releasing the pressurized gas built up within the valve chamber as when an excessive amount of gas has been released from the pressure vessel.

BRIEF DESCRIPTION OF THE DRAWINGS

In the drawings,

FIG. 1 discloses the shut-off valve of this invention connected with the regulative means from a pressure vessel;

FIG. 2 discloses a longitudinal cross sectional view of the shut-off valve of this invention;

FIG. 18 provides a cross sectional view of the relief valve that connects upon the safety shut-off valve of this invention.

DESCRIPTION OF THE PREFERRED EMBODIMENT

Figure 3:
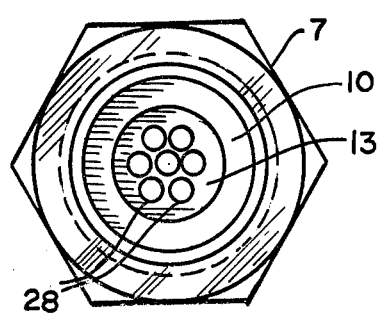
FIG. 3 provides the inlet end view of the valve shown in FIG. 2.
Figure 5:
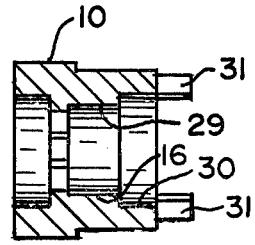
FIG. 5 provides a sectional view of the valve means taken along the line 5—5 of FIG. 4.

In referring to the drawings, and in particular FIG. 1, there is disclosed the safety shut-off valve 1 of this invention, being threaddedly connected with the outlet line 2 leading from the regulator 3 connecting with the flow line 4 leading from the vessel of pressurized gas (not shown). A pair of pressure gauges 5 and 6 provide instant readings of the various pressures at the regulator, as through gauge 5, and the reduced pressure of the gas being delivered from the regulator, as at gauge 6.

In referring to FIG. 2, the shut-off valve 1 is more accurately shown, and comprises a housing 7 having a passageway 8 provided entirely longitudinally through the same, with one end of the housing being threaded as at 10 to provide for the threaded engagement of a fitting so that this valve may be connected with the flow line leading from the regulator, as previously shown in FIG. 1. The interior of the passage 8 through the housing 7 is reamed to provide various counterbores that form shoulders for accommodating the various operating components of the valve, and as can be seen, a valve means 10 forcefully inserts within the housing, for snug retention therein, and it contacts snugly against a gasket 11 which forms what later will be defined as a second valve seat for the invention. The valve means 10 contains a passage also through it, as at 12, the individual passages being formed within a base 13 that provides stabilization at one end for a spring 14, with the spring at its opposite end being biased against a valve, such as the flapper valve 15, which valve normally rests upon a valve seat 16 formed by the shown integral shoulder within the valve means 10. Thus, within this arrangement, the flapper valve 15 is generally disposed for movement, under restrictive conditions that will be subsequently analyzed, between the first valve seat 16, and the second valve seat, as at 17, formed upon the elastomeric gasket 11.

The gasket 11, as previously briefly alluded to, snuggly rests against an integral shoulder 18 extending inwardly from the housing 7 and into its passage 8, thereby providing firm support for the second valve seat when the flapper valve 15 may be urged against the same due to the excessive force of the fluid that may be passing through this shut-off valve. During operative conditions a regulator 19 is disposed for limited longitudinal shifting within the housing passage 8, and this regulator includes a channel-like member 20 extending its full length, having an integral flange 21 extending annularly and outwardly from the channel 20, with this flange normally entering into proximity with the housing shoulder 18 as when the pressurized gas from its source has been shut off. One end, as at 22, of the regulator 19 normally rests against the opposite surface of the flapper valve 15, while at its other end, as in the vicinity of 23, a spring 24, normally of greater strength than the previously mentioned spring 14, rests against the regulator 19 and constantly urges it forcefully against the back side of the said flapper valve 15, normally maintaining it in closure against its associated first valve seat 16, formed within the valve means 10, as aforesaid. The spring 24 is maintained in its adjusted position by means of the adjustment means 25 which essentially is formed as a retaining nut that threadedly engages within this proximate end of the valve housing 7. A passage 26 is also provided through this retaining nut, and the passage is preferably contoured in a manner that it will provide for the accommodation of a tool that may be used for either turning the adjustment means 25 either further inwardly within the housing 7, and thereby increasing the bias of its spring 24 against the regulator 19, or in the alternative, that the retaining nut may be further withdrawn from the housing, thereby decreasing the force of the spring upon said regulator. It is dependant upon this setting of this adjustment means that the pressure range at which this valve operates is predetermined. But, the contour for the passageway within this retaining nut 25 may be such as to accommodate, as for example, an Allen wrench that may be used for making the aforesaid adjustments to the same.

Also threaded within the same end of the housing 7 is a fitting 27, and which is of the usual design that may fasten with the outlet hose connection that provides for transfer of the pressurized fluid to the location of its usage.

As can be more accurately seen from the various details of these structural components of the shut-off valve set forth in the subsequent figures, in the end view, as shown in FIG. 3, the housing 7 contains the valve means 10 forcefully secured therein, with its base portion 13 that is useful for providing a seating for the spring 14 containing a series of apertures, as at 28, and which forms the passageway 12 through the same.

Figure 4:
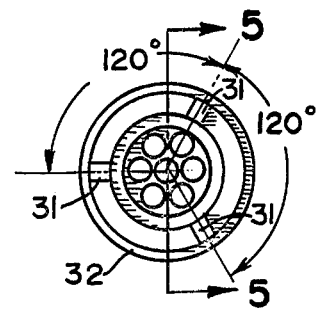
FIG. 4 provides an end view of the insert valve means of this invention which inserts within one end of the valve housing.

The valve means 10 is structured having a similar external contour comparable to that formed internally of the housing 7, and being of dimension that provide for the forceful insertion of this valve means for snug retention within the same. The valve means 10 is counterbored, as can be seen, so as to form clearance, as at 29, to provide for the loose insertion of the spring 14 therein, while another counterbore as at 30 forms the aforesaid first valve seat 16 and upon which the flapper valve 15 normally rests during nonusage of this shut-off valve. A series of legs, as at 31, and in this particular instance being three in number, as can be seen from FIG. 4, extend from the end of the valve means 10, and provide adequate clearance between each leg so that as the valve 15 unseats from its first valve seat 16, adequate clearance is provided between each of the legs 31 so that the pressurized fluid may immediately bypass the valve 15 and freely continue to flow through the passage 8 provided through the valve housing 10. At the lower end of each leg 31 is an integral and annular ring 32 and this ring is designed to provide continuity in the quantity of force that may be exerted upon the elastomeric gasket 11 so as to assure its permanent retention in place snugly against the integral shoulder 18 of the housing 7.

Figure 9:
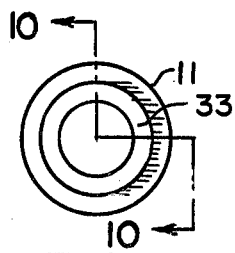
FIG. 9 provides a plan view of the gasket forming the second valve seat of this invention.
Figure 10:
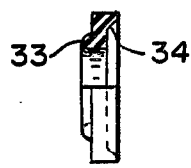
FIG. 10 provides a partial sectional and side view of the second valve seat taken along the line 10—10 of FIG. 9.
Figure 11:
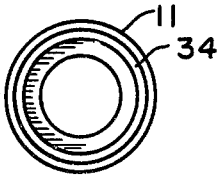
FIG. 11 provides the other side plan view of the gasket forming the second valve seat of this invention.

This elastomeric gasket, which obviously may be formed of other materials, is more specifically shown in FIGS. 9 through 11, and is annular in design, being contoured having a convexed surface, as at 33, around its circumference so as to provide a continuous seat, in this particular instance the second valve seat, for the shut-off valve and upon which the flapper valve 15 may eventually contact and seat upon in the event that too much pressurized fluid is flowing into the valve housing 7, and thereby forcefully urges the flapper valve 15 against this formed annular seal 33 so as to immediately and instantly curtail any further flow of the pressurized gas therethrough. The opposite side of the gasket 11 is contoured, as at 34, so as to provide for its snug and convenient seating upon corresponding structure formed upon the contiguous surface of the shoulder 18 formed of the housing 7. This can be seen from FIG. 2.

Figure 6:
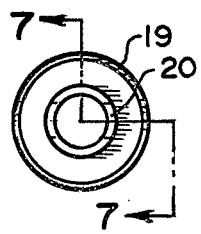
FIG. 6 provides an end view of the regulator employed in this shut-off valve.
Figure 7:
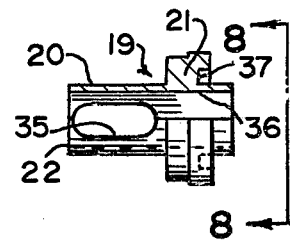
FIG. 7 furnishes a sectional view of the regulator taken along the line 7—7 of FIG. 6.
Figure 8:
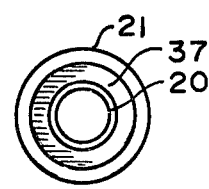
FIG. 8 provides an opposite end view of the regulator shown along the line 8—8 of FIG. 7.

The configuration of the regulator 19 is more clearly depicted in FIGS. 6 through 8, and it comprises the cylinder-like member 20 that extends its full length, having the integral flange 21 extending outwardly therefrom around its perimeter. The channel-like member 20 has some length, at its upstream end, so as to provide sufficient length for its insertion through the shoulder 18, the gasket 11, and across the spacing between the two valve seats, so that it may permanently urge its end 22 against the flapper valve 15. To assure the flow of pressurized fluid or gas through this shut-off valve when the force of fluid against the flapper valve 15 is sufficient to cause its unseating from the first valve seat 16, an aperture 35 is provided along part of the length of the channel-like member 20, and allows the pressurized fluid to enter into the passage 36 provided internally through the said regulator. The opposite end of the regulator 19 is formed having an annular recess, as at 37, between the channel-like member 20 and the flange 21, and into which the spring 24 as previously analyzed seats, and constantly urges the pressure of its generated force upon the regulator and causing it to contact against the back side of the flapper valve 15, tending to maintain it in closure against valve seat 16.

Figure 15:
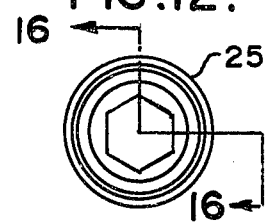
FIG. 15 provides an end view of the adjustment means or retaining nut that threadedly engages within the valve housing.
Figure 16:
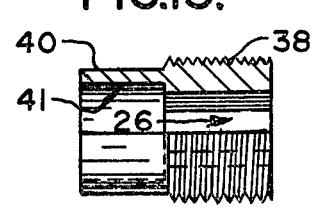
FIG. 16 provides a partial sectional and side view of the retaining nut taken along the line 16—16 of FIG. 15.
Figure 17:
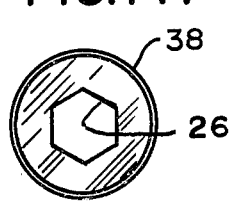
FIG. 17 furnishes an opposite end view of the retaining nut shown in FIG. 16.

The adjustment means 25, perhaps better identified as a retaining nut, is more accurately shown in FIGS. 15 through 17, and comprises a threaded boss-like portion 38 that cooperates with the threads 39 formed internally and for some distance inwardly from the end of the housing 7, as can also be seen from FIG. 2, with said retaining nut having a reduced cylindrical-like portion 40 being counterbored as at 41 therein, and acting as a seat for the opposite end of the biasing spring 24. The passageway through this retaining nut continues through that portion as previously identified at 26 and which is contoured to accomodate some type of an adjusting tool, such as an Allen wrench, as previously described. This is more accurately shown in FIG. 17.

Figure 12:
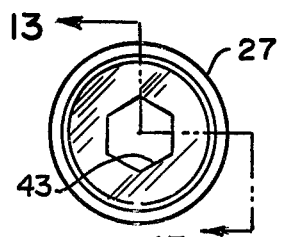
FIG. 12 provides an end view of the fitting that threads into the opposite end of the valve housing.
Figure 13:
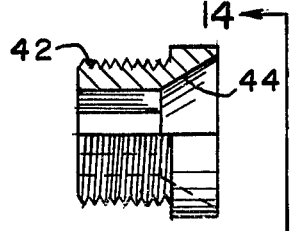
FIG. 13 provides a partial sectional and side view of the fitting taken along the line 13—13 of FIG. 12.
Figure 14:
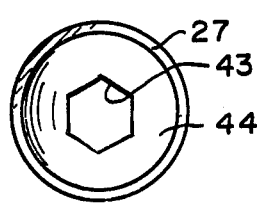
FIG. 14 provides an opposite end view of the aforesaid fitting, taken along the line 14—14 of FIG. 13.

The fitting 27 that connects into the end of the housing 7 is more accurately shown in FIGS. 12 through 14, and simply comprises a similar type of nut that threadedly engages, by means of the threads 42, with the internal threads 39 formed within the housing 7, and this fitting contains a passageway, as at 43 therethrough, so as to allow the pressurized gas to flow through and into the flow line connecting with this fitting. And, the contour of this passageway 43 may also be configured so as to accommodate some instrument, such as an Allen wrench, that may be used for tightening of this fitting within the housing 7, after the adjustment means 25 has been previously set. The fitting is bevelled, as at 44, so as to accommodate the corresponding bevel of the ferrule or sleeve (not shown) normally incorporated within a flow line connector. Such a connector, which also is not shown, then usually tightly threads onto the threaded end 45 of the valve housing 7.

In usage, the valve housing 7 will be threadedly connected with the regulator, as shown in FIG. 1, or just generally within the flowline leading from the pressure vessel. The fitting 27 may be removed from the same, in a manner as just previously described, and an Allen Wrench or other instrument may be used for adjusting the retaining nut 25 within the valve housing, so as to provide for that degree of pressure range within which this valve is desired to be operative, this setting being accomplished by either a further inward turning of the said member 25 into the housing 7, so as to heighten the degree of pressure to be accommodated by the shut-off valve, or to partially withdraw the retain nut 25 from the same, so as to lighten the necessary degree of fluid pressure to attain an unseating of the flapper valve 15 from the first valve seat 16. To aid in this setting, there may be calibration provided upon this valve so as to assure that a proper and near precise setting can be made before its usage. For example, the operator knows at what pressure of fluid passing through the valve that the flapper valve 15 will not only become unseated from its first valve seat 16, to allow for continuous flow of the pressurized gas through the same, but he also will want to know at what attained pressure above that range the flapper valve 15 will come into contact with and seat upon the second valve seat 17, provided upon the gasket 11, and thereby effectively curtail any further flow of the pressurized gas through said valve. Obviously, once that condition is met, and the shut-off valve prevents any further flow of gas from the vessel, that should the pressure be slightly reduced, the force of the spring 24 acting upon the regulator 19 will cause an unseating of the flapper valve 15 from said second valve seat 17, thereby allowing the pressurized fluid to once again flow through the flow line, or until the pressure is once again so reduced to that degree that causes a seating, once again, of the flapper valve 15 upon the first valve seat 16. Thus, through the use of this shut-off valve, there is a high and low pressure that sets a range at which continuous flow of pressurized fluid through this valve will occur, but once the extremes are encountered the valve will shut-off by contact of the flapper valve 15 with one or the other of the aforementioned valve seats, preventing the flow of fluid through this shut-off valve.

As can be seen from FIG. 1, a relief valve 46 is provided connecting upon the shut-off valve 1 of this invention, and it is designed to provided for a relieving of any pressurized gas that may be built up within the valve as when the flapper valve 15 has been urged against the second valve seat formed by the gasket 11. When this occurs, as when excessive pressure is released from the pressure vessel, that excessive level of pressurized gas or fluid remains in the incoming end of the valve 1, within the vicinity of its passage 8, even though the source of the pressurized gas may have been shut-off. Hence, and before the valve can be made to function, once again, this pressurized gas must be discharged from this shut-off valve. To perform this, the relief valve 46 contains a check valve 47, and it must be unseated from its valve seat 48, and when this occurs, the pressure built up within the passage 8, behind the flapper valve 15, as shown in FIG. 2, will move through the channel 49 and out through the valve 46. When this occurs, the flapper valve 15 will move under the urging of the regulator 19 back into contact with the first valve seat 16. Thus, the safety shut-off valve is once again readied for reuse during standard operation of the disclosed mechanism.

Various modifications or variations to the structure of this invention may occur to those skilled in the art upon reviewing the subject matter of this disclosure. Such variations or modifications, if within the spirit of this invention, are intended to be emcompassed by any claims to patent protection issuing upon the same. The description of the preferred embodiment set for herein is done so for illustrative purposes only.

Having thus described the invention what is claimed and desired to be secured by Letters Patent is:

1. In a safety shut-off valve for use in a flow line for delivery of a fluid including gas under regulated pressure from a source to another location for usage, comprising, a valve housing, said housing having a passage therethrough, a first valve means including a seat fixed within said housing, a shiftable valve comprising a flapper valve disposed normally resting against said valve seat to maintain said valve means in closure when pressurized fluid from the source is curtailed, a second valve seat provided downstream in said valve housing and being located a fixed distance from said first valve seat, said valve housing and first valve means cooperating to form a clearance passageway means therethrough and arranged intermediate the first and second valve seats for allowing conveyance of fluid through the housing and around the shiftable valve when the shiftable valve becomes unseated from its said first valve seat, means constantly biasing said shiftable valve away from said first valve seat, said biasing means comprising a spring means arranged between the shiftable valve and within the first valve means, a movable regulator located in said valve housing passageway and normally being biased against said shiftable valve for urging it against its first said valve seat, a second spring means normally biasing said regulator against the said same shiftable valve for urging it against its said first valve seat, said second spring means being adjustably of greater strength than the first said spring means, each of said spring means biasing in contact upon opposite sides of the said shiftable flapper valve, said regulator also including a passageway therein for conveyance of the fluid therethrough before the said shiftable valve seats upon the second valve seat, said regulator comprising a channel member, said regulator passageway extending through said member and opening at one end proximate the location of contact of said regulator with the said shiftable valve, whereby upon release of the pressurized fluid from its source it urges said shiftable valve off its first said seat for delivery of fluid to another location, and upon the release of fluid above the regulated quantity forcing said shiftable valve against the said second valve seat to shut off any further delivery of pressurized fluid therethrough.

2. The invention of claim 1 and wherein said first valve means includes integrally a series of leg means arranged downstream of said first valve seat to form the passageway arranged intermediate the said first and second valve seats.

3. The invention of claim 1 and including a shoulder formed integrally within the housing passage, and said second valve seat formed upon said integral shoulder.

4. The invention of claim 3 and including a gasket provided upon said integral shoulder and functioning as a seal for the said second valve seat.

5. The invention of claim 4 and wherein said gasket having an opening therethrough for passage of the pressurized fluid during routine operations of the said shut-off valve as pressurized fluid is being conveyed therethrough.

6. The invention of claim 4 and wherein said gasket being formed of an elastomer.

7. The invention of claim 1 and wherein said valve means comprising a cylindrical member normally forcefully seated within the housing passage, said cylindrical member having the said passageway therethrough, an integral shoulder provided internally of the said member, and said first spring means for biasing against said shiftable valve being seated upon the said shoulder, another integral shoulder formed internally of the said valve means passageway and forming the first said valve seat and against which the shiftable valve normally rests when said shut-off valve is inoperative, and clearance passageway means provided integrally of the structure of the cylindrical member and providing for passage of the pressurized fluid therepassed when the valve unseats from its said first valve seat.

8. The invention of claim 7 and wherein said clearance passageway means comprises at least one leg extending from the cylindrical member and oriented in the direction of the second valve seat, there being clearance provided to either side of the said extending leg to allow for passage of the pressurized fluid therepass during normal operation of the shut-off valve.

9. The invention of claim 8 and including a ring integrally connected to the opposite end of each extending leg and disposed against the said second valve seat to secure it in place.

10. The invention of claim 1 and including a relief valve communicating with the passageway through the housing, between the first and second valve seats, and when opened providing for a release of any pressurized fluid from therein.

11. The invention of claim 1 and further including an integral and annular flange extending outwardly of the said regulator channel member, a shoulder formed integrally within the housing passageway, said channel member flange extending into proximity with the housing shoulder as the shiftable valve comes to rest upon the said first valve seat, and said second spring means seating against the channel member integral flange and biasing said regulator against the shiftable valve.

12. The invention of claim 11 and including an adjustment means engaging within the passageway proximate one end of the housing and provided for regulating the degree of force exerted by the said second spring means against the regulator and thereby varying the range of pressurized fluid to pass through the valve before shut-off occurs.

13. The invention of claim 12 and wherein said adjustment means having a passageway therethrough.

14. The invention of claim 13 and wherein said adjustment means comprises a threaded nut threadedly engaged within said housing passageway.

15. The invention of claim 14 and wherein a wrench means can be accommodated within the passageway of the threaded nut for adjusting it and the quantity of force it exerts upon the second spring means.

16. The invention of claim 12 and including a fitting securing within the same end of the housing to accommodate the attachment of a flow line thereto.

* * * * *